United States Patent Office 3,645,890
Patented Feb. 29, 1972

3,645,890
REVERSE OSMOSIS MEMBRANES FROM CRYSTALLINE POLYMERS OF VINYL METHYL ETHER
Carl A. Lukach and Harold M. Spurlin, Wilmington, Del., assignors to Hercules Incorporated, Wilmington, Del.
No Drawing. Filed May 6, 1969, Ser. No. 822,289
Int. Cl. B01d 39/00, 13/00
U.S. Cl. 210—23          10 Claims

ABSTRACT OF THE DISCLOSURE

Reverse osmosis membranes useful for desalination of water comprise thin films of crystalline homopolymers or copolymers of vinyl methyl ether which are either supported on a microporous substrate or in the form of thin walled hollow fibers.

---

The present invention relates to reverse osmosis membranes. More particularly, it relates to semi-permeable membranes, useful for desalting brackish and sea water and for purifying other liquids through reverse osmosis, which are made from crystalline polymers of vinyl methyl ether. (For the sake of brevity, vinyl methyl ether is hereinafter referred to as VME, and poly(vinyl methyl ether) as PVME.)

One of the present commercial methods for the desalination of water involves forcing saline water under pressure through a semi-permeable membrane which discriminates between salt ions and water molecules, allowing water molecules to pass nearly uninhibited through the membrane while rejecting the larger salt ions. At the present time the only semi-permeable membranes used commercially in the desalination of water are composed of either cellulose acetate or a derivative of nylon. The cellulose acetate membranes are either symmetric membranes made from dense cellulose acetate or asymmetric ultrathin membranes known as Loeb-Sourirajan type membranes. See U.S. Pats. 3,133,132 and 3,133,137. Membranes made from nylon derivatives are a more recent development and are marketed under the trademark "Permasep" in the form of hollow fibers.

There are two factors that are important in judging the performance of a semi-permeable membrane for the desalination of water. First, it must reject at least 95% of salt ions and, secondly, it must have an acceptable flux rate which is a measure of the number of gallons of water per square foot of membrane per day (g.f.d.) which can be forced through the membrane.

From the standpoint of performance the Loeb-type cellulose acetate membranes are outstanding. In commercial use they are capble of rejecting more than 95% of sodium and chlorine ions at a flux rate of 10–25 g.f.d. at 1500 p.s.i. However, they possess poor resistance to compaction and are susceptible to hydrolytic and biological degradation. Hence, they have short membrane lifetimes. On the other hand, "Permasep" membranes have excellent resistance to compaction and biological degradation but have low flux rates in the order of 0.01–0.1 g.f.d., and relatively poor salt rejection.

Amorphous PVME has been dissolved in salt water prior to desalination for the purpose of plugging micropores in a cellulose acetate membrane to improve its efficiency. Such amorphous polymer has no salt-rejecting properties of its own when used by itself as a membrane.

In accordance with the present invention it has been discovered that excellent reverse osmosis membranes for desalination of water and other purposes as well can be made from crystalline PVME and copolymers of VME with another alkyl vinyl ether. The crystalline polymers useful in the present invention have a percent crystallinity of at least 5% as determined by infrared analysis (utilizing bands at $12.13\mu$ and $12.65\mu$ for denoting crystalline and amorphous content), and a molecular weight delineated by a reduced specific viscosity (RSV) of from 1 to 20. When it is a copolymer, it can contain as a comonomer up to about 90 mole percent of a vinyl alkyl ether in which the alkyl group contains from 2–4 carbon atoms. The alkyl group may also carry substitutents, such as halogen, to facilitate cross-linking. (By the term "RSV" is meant $\eta_{sp./c.}$ determined on a 0.1% solution (0.1 g. of the polymer per 100 ml. of solution) of the polymer in cyclohexanone at 135° C.) Crystalline PVME is a known polymer which can be prepared by the process described in U.S. Patent 3,284,426 to Edwin J. Vandenberg. The same process can be used to prepare crystalline copolymers of VME with another vinyl alkyl ether.

Although the membranes of the invention have somewhat lower flux rates than the Loeb-type cellulose acetate membranes of the prior art, they are highly resistant to compaction and to hydrolytic and biological degradation and, hence, have long lifetimes. By varying the chemical and physical structure of the membranes it is possible to vary their rejection capacity and flux rate over a wide range. Thus, for example, membranes having a flux rate and low salt-rejecting capacity can be prepared which are useful primarily for purposes other than desalination of water, while membranes of modest flux rate and high salt-rejecting capacity can be prepared which are eminently useful for desalination.

The membranes of the present invention have as their essential element a thin film of a crystalline VME polymer, as above defined. From the structural standpoint, there are two principal forms of membrane, i.e., (1) membranes which are composed of a thin film of the polymer supported on a microporous substrate which is permeable to saline water and which can be conveniently of any shape, e.g., flat, tubular, spiral or corrugated, and (2) membranes consisting of a thin walled hollow fiber of the polymer. The thin films of the polymer, which are components of both structural types of membranes, can be prepared by any of the methods known to the art for fabrication of films from moldable polymers, such as casting, coating, extrusion, and the like.

In a further embodiment of the invention the crystalline VME polymer can be cross-linked by means of any of the crosslinking agents known to the art to improve salt rejection capacity at the expense of a somewhat reduced flux rate. Suitable crosslinking agents include the azido compounds described in U.S. Patents. 3,058,957 and 3,284,421.

The following examples are presented for the purpose of illustrating the invention. In the examples parts are by weight unless otherwise specified.

EXAMPLE 1

A 4 x 5 inch sheet of filter material composed of mixed esters of cellulose of $0.01\mu$ pore size (Millipore Corporation VF filter material) was floated on the surface of deionized water, with the dull side down (glossy side up), for 5 minutes. The sheet was lifted with forceps, tilted to drain off excess water, and placed, wet side down, upon a glass plate. A piece of adhesive tape was placed across the top edge to hold the sheet to the glass.

A 1.0 g. sample of crystalline (32%) PVME of RSV 9.6 was dissolved in 50 ml. of 1,1,2,2-tetrachloroethane. The 2% (w./v.) solution was filtered under pressure through a $1.2\mu$ pore size filter material. The polymer solution was placed near the top of the above prewet VF support sheet, beneath the leading edge of a 10-mil casting knife (2½ inches wide). After drawing the solution across the entire length of the VF support sheet with the casting knife, the glass plate was placed in a level position in a cabinet through which filtered air was circulated. After 16 hours, a dry PVME film, of calculated thickness 0.20 mil, was obtained over the VF support sheet.

A 47 mm. diameter disc was cut from the above membrane (including the VF support sheet). Soaking in water helped to remove the cut disc from the glass plate. The membrane was then evaluated as follows.

Test apparatus and method

Each test cell consisted of a 6-bolt Millipore 47 mm. high-pressure filter holder (Cat. No. XX45 047 00) which holds a 47 mm. diameter membrane on a support screen between two stainless steel plates. An additional hole was distilled into the top plate, so that the brine solution could enter the cell, circulate over the membrane, and leave the cell. The permeate was collected from the bottom port of the cell and analyzed.

Eight such cells were connected in parallel, through a series of suitable valves, to three back pressure regulators, a pump and a 100-gallon reservoir, to provide a recirculating assembly capable of evaluating eight membranes simultaneously at two different pressures (four cells at each pressure). Pumping rates were up to 0.5 gallon per minute (30 gallons per hour).

The brine solution in the reservoir contained dissolved NaCl and $Na_2SO_4$ in amounts providing the ion concentration noted in the examples. It was analyzed each day for $Na^+$ and $Cl^-$ concentration, using a Beckman Expandomatic pH meter and appropriate electrodes. The min. The membranes were kept first at 500 p.s.i., and then at 1000 p.s.i., for long enough times to collect enough permeate for analysis. The membranes were then kept at 1500 p.s.i. for extended lengths of time, while permeate samples were measured and analyzed periodically.

Percent rejection of any ion was calculated from the p.p.m. of the ion in the permeate and the feed solution as follows:

If X is any ion (e.g., $Na^+$, $Cl^-$ or $SO_4^=$), then

Percent rejection of X $$= \frac{\text{(p.p.m. } X \text{ in feed minus p.p.m. } X \text{ in permeate)}}{\text{p.p.m. } X \text{ in feed}} \times 100$$

Permeate rate and analysis

Analysis of the permeate collected, compared to the feed solution gave the following salt rejections.

| | Colorless permeate | | | |
|---|---|---|---|---|
| | | Sodium | | Chloride |
| Pressure, p.s.i. | G.f.d. | P.p.m. | Percent rejection [1] | P.p.m. | Percent rejection [1] |
| 500 | | | | | |
| 1,000 | | | | | |
| 1,500 | 0.14 | | | | |
| 1,500 | 0.16 | [2] 33.5 | 99.1 | [2] 53 | 98.6 |

[1] Feed solution analysis, 3,500 p.p.m. $Na^+$, 3,750 p.p.m. $Cl^-$.
[2] Samples at 1,500 p.s.i. combined.

EXAMPLES 2–5

Solt rejections of membrances prepared in a similar manner to Example 1 (from different PVME samples with supports wet with different solvents) and evaluated at 1500 p.s.i. are given below in Table 1 (Examples 2, 3, 4 and 5).

TABLE 1

| | PVME | | | Dry film thickness (mils) | Percent rejection | | | Flux rate (g.f.d.) |
|---|---|---|---|---|---|---|---|---|
| | RSV | Percent crystallinity | Support prewet with— | | $Na^+$ | $Cl^-$ | $SO_4^{--}$ | |
| Example: | | | | | | | | |
| 2 | 2.2 | 37 | TCE [1] | 0.7 | 98.8 | 98.5 | 93 | 0.21 |
| 3 | 9.6 | 32 | TCE [1] | 0.5 | 92.9 | 92.3 | | 0.05 |
| 4 | 9.6 | 32 | TCE [1] | 0.2 | 97.4 | 93.4 | 96.7 | 0.12 |
| 5 | 9.6 | 32 | $H_2O$ | 0.1 | 98.0 | 97.6 | 96.9 | 0.16–0.23 |

[1] Tetrachloroethane.

sulfate ion was calculated from these two values, using the expression p.p.m. $SO_4^{--}$ = (2.09 p.p.m. $Na^+$ minus 1.35 p.p.m. $Cl^-$)

sulfate ion concentrations were also determined independently by a titration method. These values usually agree well with the calculated value.

The brine solution also contained a small amount of both ethyl violet and Rhodamine B. When a membrane contained a small pinhole, a pink-purple dot from these dyes was visible on the GS filter below the membrane after testing.

EXAMPLE 6

A 1.0 g. sample of the polymer used in Example 1 was refluxed for 20 hours with boiling anhydrous methyl alcohol (75 ml.). The hot mixture was filtered quickly and the more crystalline, insoluble fraction recovered (0.63 g., 63%). It was dissolved in 31.4 ml. of 1,1,2,2-tetrachloroethane (2% solution), filtered and used to coat a substrate in the same manner as described in Example 1.

Evaluation of the resulting membrane gave the following results.

| | | Colorless permeate | | | | |
|---|---|---|---|---|---|---|
| | | Sodium | | Chloride | | Sulfate |
| Pressure, p.s.i. | G.f.d. | P.p.m. | Percent rejection [1] | P.p.m. | Percent rejection [1] | P.p.m. | Percent rejection |
| 500–1,000 | 0.22 | 220 | 93.9 | 290 | 91.5 | | |
| 1,500 | 0.34 | 74 | 97.9 | 125 | 96.3 | 84 | 95.5 |

[1] Feed solution, 3,600 p.p.m. $Na^+$, 3,400 p.p.m. $Cl^-$, 1,935 p.p.m. $SO_4^{--}$.

The membrane to be tested was cut to a 47 mm. diameter size and placed in the test cell atop two 47 mm. Millipore GS filter discs (0.22μ pore size; 45,000 g.f.d. at 1500 p.s.i.). Depending upon the number of cells in operation, the brine solution was circulated through the cell, and over the membrane at the rate of 200–400 ml./

EXAMPLE 7 (CASTING ON GLASS)

When the same polymer solution as in Example 6 was cast directly on glass, and the membrane was removed, placed on a Millipore VF filter, and evaluated, the following results were obtained.

|  | Colorless permeate | | | | |
|---|---|---|---|---|---|
| Pressure, p.s.i. | G.f.d. | Sodium | | Chloride | |
| | | P.p.m. | Percent rejection [1] | P.p.m. | Percent rejection [1] |
| 500 | 1.56 | 1,500 | 58.3 | 1,950 | 42.7 |
| 1,000 | 1.81 | 950 | 73.6 | 1,300 | 61.8 |
| 1,500 | 1.70 | 505 | 86.0 | 765 | [2] 77.5 |

[1] Feed solution, 3,600 p.p.m. Na+, 3,400 p.p.m. Cl−, 1,935 p.p.m. SO4−−.
[2] 99.6% sulfate ion rejection.

EXAMPLES 9–13

Evaluation of other membranes, prepared in a manner analogous to Example 8, are given in Table 2. They illustrate different salt rejections as the crystallinity of the PVME is varied.

TABLE 2.—EVALUATION OF MEMBRANES FOR DESALINATION

| Example No. | Polymer, RSV | Percent crystallinity | Film thickness (mils) | Pressure (p.s.i.) | Time [1] (hr.) | Percent rejection | | | Permeate rate (g.f.d.) | Permeate, pH [2] |
|---|---|---|---|---|---|---|---|---|---|---|
| | | | | | | Na+ | Cl− | SO4−− | | |
| 8 | 4.4 | 36 | 0.68 | 500–1,500 | 12.9 | 91 | 78 | | 0.12 | |
| | | | | 1,500 | 12.7 | 99.0 | 96.6 | 92.9 | 0.08 | |
| | | | | 1,500 | 4.6 | 99.4 | 98.1 | | 0.08 | 7.87 |
| | | | | 1,500 | 44.5 | 99.5 | 98.8 | | 0.07 | |
| | | | | 1,500 | 18.1 | 99.0 | 98.8 | | 0.05 | |
| 9 | 12.2 | [3] High | 0.68 | 500 | 2.0 | 78 | 59 | | 0.9 | |
| | | | | 1,000 | 2.0 | 81 | 66 | | 1.2 | 7.21 |
| | | | | 1,500 | 2.5 | 89 | 78 | 62 | 2.1 | |
| | | | | 1,500 | 17.1 | 93 | 82 | 80 | 0.9 | 7.18 |
| | | | | 1,500 | 27.3 | 96 | 90 | | 0.5 | |
| | | | | 1,500 | 17.4 | 96 | 90 | | 0.3 | |
| 10 | 2.2 | 37 | 0.66 | 500–1,500 | 12.7 | 86 | 71 | | 0.18 | |
| | | | | 1,500 | 10.4 | 95.6 | 88 | | 0.18 | |
| 11 | 2.7 | 42 | 0.66 | 500 | 2.5 | 36 | 16 | | 1.8 | |
| | | | | 1,000 | 2.0 | 33 | 19 | | 3.0 | |
| | | | | 1,500 | 6.0 | 67 | 43 | | 2.0 | |
| | | | | 1,500 | 10.7 | 70 | 50 | | 1.5 | |
| 12 | 17.4 | 17 | <0.68 | 500 | 2.5 | 54 | 39 | | 1.6 | |
| | | | | 1,000 | 2.0 | 59 | 46 | | 3.0 | |
| | | | | 1,500 | 2.5 | 63 | 51 | | 3.0 | 7.43 |
| | | | | 1,500 | 17.1 | 69 | 58 | | 1.9 | |
| | | | | 1,500 | 44.8 | 72 | 58 | | 0.9 | |
| 13 | 1.7 | [3] Low | 0.66 | 500 | 4.0 | 33 | 22 | | 5.8 | |
| | | | | 1,000 | 2.0 | 48 | 22 | | 6.5 | |
| | | | | 1,500 | 9.0 | 52 | 22 | | 6.9 | |
| | | | | 1,500 | 10.1 | 48 | 19 | | 6.5 | |

[1] Successive increments.
[2] Feed solution pH was 7.81.
[3] By X-ray.

EXAMPLE 8

The same procedure was used as in Example 1 except that
(a) the VF support sheet was prewet with chloroform,
(b) the polymer solution (3.5%) was prepared from 0.28 g. of partially crystalline (46%) PVME of RSV 4.4, and 8 ml. chloroform,
(c) a 25-mil casting blade was used and the calculated dry film thickness was 0.88 mil.

Evaluation of the resulting membrane in the same manner gave the following results:

| Time, min. | Pressure, p.s.i. | Colorless permeate | | | | | Sulfate, percent rejection |
|---|---|---|---|---|---|---|---|
| | | G.f.d. | Sodium | | Chloride | | |
| | | | P.p.m. | Percent rejection [1] | P.p.m. | Percent rejection [1] | |
| 240 | 500 | | | | | | |
| 145 | 1,000 | | | | | | |
| 386 | 1,500 | 0.108 | [1] 300 | 90.5 | [1] 725 | 77.7 | |
| 759 | 1,500 | 0.083 | [1] 30 | 99.0 | [1] 110 | 96.6 | 92.9 |
| 275 [3] | 500–1,000 | 0.083 | [2] 19.5 | 99.4 | [2] 64 | 98.1 | |
| 931 [4] | 500–1,000 | | | | | | |
| 1,026 | 1,500 | 0.072 | 41 | 98.7 | 130 | 96.1 | |
| 1,642 | 1,500 | 0.049 | 15 | 99.5 | 38 | 98.8 | |
| 1,040 | 1,500 | 0.037 | 30 | 99.0 | 41 | 98.8 | |

[1] Feed solution, 3,150 p.p.m. Na+; 3,200 p.p.m. Cl−.
[2] Feed solution, 3,150 p.p.m. Na+; 3,300 p.p.m. Cl− hereafter.
[3] Pressure reduced; feed solution changed; system restarted at 500 p.s.i.
[4] System shut off for 1,160 min. and then started again at 500 p.s.i.

EXAMPLE 14 (SPRAYING)

A 1% solution of the crystalline (32%) PVME sample used in Example 1 was prepared from 1.0 g. PVME, 80 ml. chloroform and 20 ml. of 1,1,2,2-tetrachloroethane. A portion of this solution was diluted to 0.5% concentration by diluting with ethylene dichloride, and the resulting solution was sprayed over a water-wet support sheet (8 x 2¾ inches) of Millipore VF filter material over a metal backing plate. After drying (calculated coating thickness, 0.6–1.2μ), a 47 mm. diameter disc was cut and evaluated as described previously, with the following results.

| Time, min. | Pressure, p.s.i. | G.f.d. | Colorless permeate | | | | | |
|---|---|---|---|---|---|---|---|---|
| | | | Sodium | | Chloride | | Sulfate | |
| | | | P.p.m. | Percent rejection | P.p.m. | Percent rejection | P.p.m. | Percent rejection |
| 267 | 500–1,000 | 0.10 | | | | | | |
| 72 | 1,500 | 0.32 | 91 | 97.2 | 135 | 96.0 | | |
| 456 | 1,500 | 0.30 | 93 | 97.2 | 130 | 96.2 | 72 | 96.3 |
| 502 | 1,500 | 0.23 | 72 | 97.8 | 100 | 97.1 | 90 | 95.6 |

Note.—Feed solution 3,300 p.p.m. Na+; 3,400 p.p.m. Cl−; 1,935 p.p.m. SO4−−.

EXAMPLES 15 AND 16

The following results (Table 3) were obtained for membranes prepared in an analogous manner to Example 14 with different polymer solution concentrations and with dry support sheets.

(b) The VF support sheet was prewet with chloroform,
(c) A 50-mil casting blade was used so that the calculated dry film thickness was 1 mil.
Evaluation of the resulting membrane in the same manner gave the following results:

TABLE 3

| Example No. | Solution conc., percent | Calculated dry film thickness (μ) | Pressure | Time (min.) | Percent rejection | | | Permeate flux (g.f.d.) |
|---|---|---|---|---|---|---|---|---|
| | | | | | Na+ | Cl- | SO4-- | |
| 15 | 1 | 1.3–2.5 | 1,500 | 465 | 94.4 | 93.5 | | 0.12 |
| | | | 1,500 | 755 | 94.3 | 92.9 | 86.4 | 0.11 |
| | | | 1,500 | 2,020 | 96.0 | 95.1 | 94.9 | 0.09 |
| 16 | 0.25 | 0.3–0.6 | 500–1,500 | 143 | 95.7 | 94.2 | | 0.40 |
| | | | 1,500 | 534 | 92.8 | 91.5 | 90.1 | 0.48 |
| | | | 1,500 | 490 | 92.8 | 91.5 | | 0.33 |

EXAMPLES 17–19
(CROSS-LINKED PVME)

A 2.7% solution was prepared from 1.0 g. of highly crystalline PVME (RSV 12.2) and 37.5 ml. chloroform. To 10 ml. of this solution (0.27 g. PVME) was added 0.45 ml. of an 0.6% solution in chloroform of hexamethylene bis(diazoacetate) (0.027 g. diazo ester; 1% based on PVME) having the structure

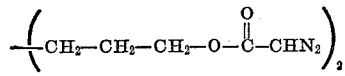

This solution was cast with a 25-mil casting blade over a sheet of Millipore VF filter sheet, prewet with chloroform and taped to a glass plate. After drying 16 hours at room temperature under a stream of filtered air, the support and membrane were heated for 29 hours at 80° C. After cooling, 47 mm. discs were cut and evaluated as before.

The permeate rates and salt rejections obtained for this membrane, as well as those prepared from the same PVME sample uncross-linked, and one containing 3% cross-linking agent, are given in Table 4.

| Time, min. | Pressure P.S.I. | G.f.d. | Colorless permeate | | | |
|---|---|---|---|---|---|---|
| | | | Sodium | | Chloride | |
| | | | P.p.m. | Percent rejection[1] | P.p.m. | Percent rejection |
| 42 | 500 | | | | | |
| 245 | 1,000 | | | | | |
| 960 | 1,500 | 0.044 | 160 | 94.7 | 300 | 91.0 |

[1] Feed solution: 3,000 p.p.m. Na+; 3,350 p.p.m. Cl-.

As has been demonstrated in the examples, excellent reverse osmosis membranes can be prepared from crystalline PVME and crystalline copolymers of VME with another vinyl alkyl ether in which the alkyl group contains form 2–4 carbon atoms, and in which copolymer the molar percentage of VME is at least 10%. The polymer also has a crystallinity of at least 5% but when it is to be used in uncross-linked form, best results are obtained when it has a crystallinity of at least 20%. Quite surprisingly, membranes which have been prepared in an identical manner from cystalline homopolymers of higher vinyl alkyl ethers such as vinyl ethyl ether, vinyl N-propyl

TABLE 4.—EFFECT OF CROSS-LINKING PVME [1]

| | | Example | | | | | | | | |
|---|---|---|---|---|---|---|---|---|---|---|
| | | 17 | | | | 18 | | 19 | | |
| Time[2] (min.) | Pressure (p.s.i.) | Percent rejection | | | Permeate (g.f.d.) | Rejection, percent | | Permeate (g.f.d.) | Percent rejection | | | Permeate (g.f.d.) |
| | | Na+ | Cl- | SO4-- | | Na+ | Cl- | | Na+ | Cl- | SO4-- | |
| 95 | 500 | 69 | 45 | | 1.6 | 47 | 21 | 2.8 | 80 | 66 | | 0.7 |
| 135 | 1,000 | 70 | 53 | | 1.9 | 48 | 36 | 4.3 | 77 | 61 | | 1.16 |
| 50 | 1,500 | 78 | 60 | 97.4 | 2.3 | 56 | 42 | 4.6 | 83 | 68 | 95.4 | 1.39 |
| 316 | 1,500 | 83 | 68 | 98.8 | 1.8 | 68 | 52 | 3.4 | 88 | 76 | 98.9 | 1.32 |
| 634 | 1,400 | [3]84 | [3]67 | | 1.5 | 76 | 55 | 2.4 | 90 | 73 | | 1.09 |
| Membrane removed, stored five days and rerun | | | | | | | | | | | | |
| 120 | 1,500 | 72 | 59 | | 2.3 | 61 | 48 | 2.2 | 79 | 67 | | 1.46 |
| 120 | 1,500 | 75 | 57 | | 2.0 | 63 | 52 | 2.3 | 82 | 67 | | 1.43 |
| 105 | 1,500 | 76 | 63 | | 1.7 | 63 | 54 | 2.0 | 83 | 73 | | 1.22 |
| 333 | 1,550 | 77 | 61 | | 1.3 | 59 | 50 | 1.7 | 85 | 73 | | 0.83 |
| 607 | 1,700 | 78 | 59 | | 1.1 | 63 | 48 | 1.5 | 87 | 78 | | 0.76 |

[1] All membranes were 0.68 mil thick.
[2] Successive increments.
[3] 96.7% sulfate ion rejection.
NOTES.—Example 17, Uncross-linked; Example 18, Containing 1 wt. percent of a bis(diazo ester) cross-linking agent; Example 19, Containing 3 wt. percent of a bis(diazo ester) cross-linking agent.

EXAMPLE 20
(VME COPOLYMER)

The same procedure was used as in Example 1 except that
(a) A crystalline copolymer of vinyl methyl ether and vinyl tert-butyl ether was used instead of PVME as a 2% solution in chloroform, ether and vinyl isobutyl ether are completely impermeable to water when tested by the procedure described in the examples.

As previously explained, cross-linking of the polymer in the preparation of the membranes of the present invention produces an improvement in salt reection capacity at the expense of a lower flux rate. The method by which crystalline PVME and crystalline copolymers of VME can be cross-linked are well known to the art and require no eleborate explanation. The preferred cross-linking agents for use in the invention are the azido formates described in U.S. Patent 3,284,421 and the polysulfonazides described in U.S. Patent 3,058,957. In the practice of the present invention the cross-linking agents are preferably employed in an amount to produce a percent gel of less than about 80%, i.e., too extensive cross-linking should be avoided as this will lead to a membrane having an excessively low flux rate.

The examples have demonstrated the preparation of planar membranes comprising a thin film of the crystalline polymer supported on a microporous substrate permeable to saline water. The essential element of the the membranes of the invention is a thin film of a crystalline polymer as above defined. The thickness of the film can be varied considerably from less than a micron up to about 2.0 mils but is desirably as thin as obtainable by the process employed for its preparation. The examples have demonstrated the preparation of films by casting and spraying. In addition satisfactory films can be prepared by compression molding and extrusion.

In the case of films in any form other than a hollow fiber it is necessary that the film be supported upon a microporous substrate which is permeable to saline water, the substrate being necessary to provide a structure of sufficient strength to serve as a membrane. Useful supports are well known in the art of desalination and can be prepared from various materials such as nylon, cellulose acetate, polyvinyl chloride, nitrocellulose, metals, poly(tetrafluoroethylene) and other materials. Desirably, this support should have as small a pore size as is consistent with permeability to salt ions. A suitable pore size range is from about 0.01 to 5 microns.

In the preparation of planar membranes the film of crystalline VME polymer can be cast or sprayed directly upon the substrate or the film can be separately formed and then laid upon the substrate, both techniques having been illustrated in the examples. Prewetting of the substrate with a liquid which does not swell it is desirable to prevent expansion or contraction of the substrate during casting and drying.

It is also possible to fabricate membranes in the form of thin walled hollow fibers. In such case no support or substrate is necessary as the stresses to which a hollow fiber membrane are subjected in desalination processes are obviously different from those to which a planar membrane is subjected.

Membranes of this invention are eminently useful for desalting brackish water and sea water. In addition they are also useful in other industrial applications employing the principle of reverse osmosis such as purification of water supplies, purification and concentration of process recycle streams, purification and concentration of waste streams before disposal, and concentration of various materials such as maple syrup, citrus juice, whey, coffee, soup, malt beverages, and spent sulfite pulping liquors. Thus, these membranes are useful in the food and beverage industry, the chemical industry, in the forest products industry and in the medicinal and pharmaceutical industries.

What I claim and desire to protect by Letters Patent is:

1. A reverse osmosis membrane comprising a thin film of a polymer selected from the group consisting of poly(vinyl methyl ether) and copolymers of vinyl methyl ether with up to 90 mole percent of another vinyl alkyl ether in which the alkyl group contains from 2 to 4 carbon atoms supported upon a microporous substrate permeable to salt ions, said polymer being characterized by a crystallinity determined by infrared analysis of at least 5% and a reduced specific viscosity of from 1 to 20.

2. The membrane of claim 1 in which the polymer is poly(vinyl methyl ether).

3. The process of desalinating water which comprises forcing saline water under pressure through the membrane of claim 1, whereby water molecules are caused to pass through the membrane while the salt ions are rejected from passing through the membrane.

4. The membrane of claim 1 in which the polymer is cross-linked.

5. The process of desalinating water which comprises forcing saline water under pressure through the membrane of claim 4, whereby water molecules are caused to pass through the membrane while the salt ions are rejected from passing through the membrane.

6. A reverse osmosis membrane consisting of a thin walled hollow fiber of a polymer selected from the group consisting of poly(vinyl methyl ether) and copolymers of vinyl methyl ether with up to 90 mole percent of another vinyl alkyl ether in which the alkyl group contains from 2 to 4 carbon atoms, said polymer being characterized by a crystallinity determined by infrared analysis of at least 5% and a reduced specific viscosity of from 1 to 20.

7. The membrane of claim 6 in which the polymer is poly(vinyl methyl ether).

8. The process of desalinating water which comprises forcing saline water under pressure through the membrane of claim 6, whereby water molecules are caused to pass through the membrane while the salt ions are rejected from passing through the membrane.

9. The membrane of claim 6 in which the polymer is cross-linked.

10. The process of desalinating water which comprises forcing saline water under pressure through the membrane of claim 9, whereby water molecules are caused to pass through the membrane while the salt ions are rejected from passing through the membrane.

References Cited

UNITED STATES PATENTS

| | | | |
|---|---|---|---|
| 3,228,876 | 1/1966 | Mahon | 210—22 |
| 3,276,996 | 10/1966 | Lazare | 210—22 |
| 3,373,056 | 3/1968 | Martin | 210—23 X |

OTHER REFERENCES

Banks et al., "The Mechanism of Desalination by Reverse Osmosis, and Its Relation to Membrane Structure," from the U.S. Office of Saline Water R & D Report No. 143, received in Patent Office Oct. 7, 1965, 84 pages, pp. 55–59 relied on.

Francis, "Fabrication and Evaluation of New Ultra Thin Reverse Osmosis Membrane," from the U.S. Office of Saline Water R & D Report No. 177, received in Patent Office May 6, 1966, 50 pages, pp. 7–21 relied on.

FRANK A. SPEAR, Jr., Primary Examiner

U.S. Cl. X.R.

210—321, 500